(12) United States Patent
Dubanchet et al.

(10) Patent No.: US 9,814,349 B2
(45) Date of Patent: Nov. 14, 2017

(54) SOL-GEL COATING COMPRISING ANISOTROPIC PARTICLES AND CULINARY ARTICLE PROVIDED WITH SUCH A COATING

(71) Applicant: SEB S.A., Ecully (FR)

(72) Inventors: Aurelien Dubanchet, Gresy sur Aix (FR); Stephanie Le Bris, Chambery (FR); Jean-Luc Perillon, Saint Paul Trois Chateaux (FR)

(73) Assignee: SEB S.A., Ecully (FR)

( * ) Notice: Subject to any disclaimer, the term of this patent is extended or adjusted under 35 U.S.C. 154(b) by 332 days.

(21) Appl. No.: 14/373,789

(22) PCT Filed: Jan. 18, 2013

(86) PCT No.: PCT/FR2013/050115
§ 371 (c)(1),
(2) Date: Jul. 22, 2014

(87) PCT Pub. No.: WO2013/110882
PCT Pub. Date: Aug. 1, 2013

(65) Prior Publication Data
US 2015/0201799 A1  Jul. 23, 2015

(30) Foreign Application Priority Data

Jan. 25, 2012  (FR) ...................... 12 00226

(51) Int. Cl.
*A47J 36/02* (2006.01)
*B05D 5/08* (2006.01)
(Continued)

(52) U.S. Cl.
CPC .............. *A47J 36/02* (2013.01); *B05D 3/207* (2013.01); *B05D 5/08* (2013.01); *B05D 7/14* (2013.01);
(Continued)

(58) Field of Classification Search
None
See application file for complete search history.

(56) References Cited

U.S. PATENT DOCUMENTS 6,103,361 A * 8/2000 Batzar .................. B05D 3/207
427/127
2007/0207328 A1  9/2007 Frost et al.
(Continued)

FOREIGN PATENT DOCUMENTS

CN  101029392 A  9/2007
CN  101092005 A  12/2007
(Continued)

OTHER PUBLICATIONS

Machine translation JP 2008-012445 (2008).*

*Primary Examiner* — Alexandre F Ferre
(74) *Attorney, Agent, or Firm* — The Webb Law Firm

(57) ABSTRACT

Provided is a vitreous coating comprising at least one layer embodied in the form of a continuous film of sol-gel material comprising a matrix formed from at least one metal polyalkoxylate and wherein anisotropically-shaped particles are dispersed, said layer comprising at least one area wherein the particles are particles predominantly inclined by an angle ($\alpha$) of between 20° and 90° relative to the median plane of the film. The subject matter of the present invention also comprises a method of manufacturing such a coating, and a culinary article one of the surfaces of which is coated with such a coating.

36 Claims, 4 Drawing Sheets

(51) Int. Cl.
  *B05D 3/00* (2006.01)
  *B05D 7/14* (2006.01)
  *C09D 183/04* (2006.01)
  *H01F 1/01* (2006.01)

(52) U.S. Cl.
  CPC ............ *C09D 183/04* (2013.01); *H01F 1/01* (2013.01); *B05D 2601/28* (2013.01); *Y10T 428/24612* (2015.01); *Y10T 428/31612* (2015.04); *Y10T 428/31663* (2015.04)

(56) References Cited

U.S. PATENT DOCUMENTS

| | | |
|---|---|---|
| 2007/0298244 A1 | 12/2007 | Yasuda et al. |
| 2009/0280307 A1* | 11/2009 | De Rydt .............. B05D 3/207 428/207 |
| 2010/0181322 A1* | 7/2010 | Perillon ............... A47J 36/02 220/573.2 |
| 2011/0174826 A1 | 7/2011 | Le Bris et al. |
| 2011/0189546 A1 | 8/2011 | Ikeda |
| 2011/0192850 A1 | 8/2011 | Le Bris et al. |
| 2011/0308989 A1 | 12/2011 | Berrux et al. |
| 2013/0320024 A1 | 12/2013 | Perillon et al. |

FOREIGN PATENT DOCUMENTS

| | | |
|---|---|---|
| CN | 102076251 A | 5/2011 |
| EP | 2206801 A1 | 12/2008 |
| JP | 2001232285 A | 8/2001 |
| JP | 2001515784 A | 9/2001 |
| JP | 2008012445 A * | 1/2008 |
| JP | 2014506817 A | 3/2014 |
| WO | 2010123294 A2 | 10/2010 |

* cited by examiner

4C

4D

4E

SOL-GEL COATING COMPRISING ANISOTROPIC PARTICLES AND CULINARY ARTICLE PROVIDED WITH SUCH A COATING

CROSS-REFERENCE TO RELATED APPLICATIONS

This application is the United States national phase of International Application No. PCT/FR2013/050115 filed Jan. 18, 2013, and claims priority to French Patent Application No. 1200226 filed Jan. 25, 2012, the disclosures of which are hereby incorporated in their entirety by reference.

FIELD OF THE INVENTION

The present invention generally relates to a coating obtained by a sol-gel process that incorporates anisotropic particles (flakes or fibres) and that can be used on any type of substrate, in particular metallic, as well as a culinary article provided with such a coating.

The present invention also relates to a method of applying such a coating on a substrate and the use of such a coating to manufacture a culinary article.

The targeted field is firstly that of culinary articles, but the present invention can also relate to any other type of surface, such as the sole plate of an electric iron, the plates of a hair straightener, or even or the hood of a household appliance.

DESCRIPTION OF RELATED ART

Sol-gel coatings are particularly popular in the field of culinary articles because they can be used to produce coloured coatings that have a good hardness and a temperature resistance. However, they have the disadvantage of chipping easily at some particularly sensitive areas, which are the areas of high stress of the culinary article.

To avoid this problem, as is known to those skilled in the art, flakes are incorporated in the sol-gel coating, which tend naturally to oriente themselves horizontally with respect to the support of the coating or randomly. This is particularly the case for the vitreous coating as described in EP 2206801, which comprises a flaked finish layer.

SUMMARY OF THE INVENTION

The object of the present invention is to develop an inorganic coating obtained by a sol-gel process, which has both a good hardness and a good resistance to chipping. In order to combine these advantages, an elegant method consists in incorporating flakes, and more generally, anisotropic particles, in the sol-gel coating, and in orienting them substantially perpendicular to the coating formed in the sensitive areas.

More particularly the present invention relates to a vitreous coating characterised in that it comprises at least one layer in the form of a continuous film of a sol-gel material comprising a matrix formed from at least one metallic polyalkoxylate and in which anisotropic shaped particles are dispersed, said layer comprising at least one area in which said particles are particles that are mainly inclined at an angle α comprised between 20° and 90° with respect to the average plane of the film.

In this area where the particles are substantially perpendicular, the resistance to chipping is considerably improved.

In the context of the present invention, anisotropic shaped particles are particles whose characteristic dimensions are not identical in all directions, such as for example fibres (substantially one-dimensional shaped) or flakes (substantially two-dimensional or flat shaped).

Such an orientation of the anisotropic particles may be obtained in different ways, depending on the type of anisotropic particles used.

Thus, in the case of particles capable of being oriented by mechanical means (such as fibres), the orientation substantially perpendicular to the coating layer may, for example, result from a position resulting from the method of applying the coating, such as for example the orientation through a unidirectional applicator such as a micro-nozzle.

In the case of particles capable of being oriented by physical means (for example, electrical or magnetic), the substantially perpendicular orientation of the anisotropic particles with respect to the coating layer may result from a position that is simultaneous or subsequent to the coating application, such as for example the orientation of particles magnetisable under the effect of a magnetic field or of particles electrisable under the effect of an electric field.

Advantageously, more than 66%, and preferably more than 80%, of said anisotropic shaped particles (32) may be inclined at an angle α comprised between 20° and 90° with respect to the average plane of the film.

A high proportion of particles inclined at an angle α comprised 15 between 20° and 90° with respect to the average plane of the film improves the mechanical reinforcement of the sol-gel layer by limiting the propagation of cracks that occur prior to chipping.

The magnetisable particles can be of different natures.

In the context of the present invention, the magnetisable particles may advantageously be particles comprising at least one ferromagnetic metal.

They may be homogeneous, in other words constituted of the same material, or composite, in other words the magnetisable particles have a core-shell structure wherein the ferromagnetic metal is in the core and/or in the shell of said particles.

Examples of composite magnetisable particles include in particular mica flakes encapsulated with iron oxide $Fe_2O_3$ or stainless steel fibres encapsulated with a sol-gel material, as protection against corrosion during the steps of implementation of the coating, or even flakes made of plastic material encapsulated with iron oxide $Fe_2O_3$, or flakes whose core is made of ferromagnetic metal and whose envelope is made of a plastic material or of a sol-gel material.

The coating according to the invention may advantageously further comprise non-magnetisable particles to improve the reinforcement of the coating. These non-magnetisable particles can be of any shape (spherical, fibres or flakes or "irregular" or having a core-shell structure), of micrometric, or even nanometric, size.

Examples of non-magnetisable particles that could be used in the context of the present invention include in particular mica flakes and titanium dioxide encapsulated mica or silica flakes.

According to a particularly advantageous embodiment, the vitreous coating of the present invention is not opaque (because it is free from opaque pigments) and further comprises, adjacent to the area in which the particles are substantially perpendicular to the vitreous coating layer, at least one area in which the particles are:
  either particles mainly (advantageously more than 66% of the particles, and preferably more than 80% of the particles) inclined at an angle α comprised between 0° and 20° with respect to the film (in other words arranged substantially parallel to the film), or particles randomly arranged in the layer in the form of a film, so as to form a three-dimensional pattern.

The alternation of the areas in which the particles are arranged substantially parallel and/or randomly to the sol-gel film and the areas in which the particles are particles that are mainly inclined at an angle α comprised between 20° and 90° with respect to the average plane of the film allows to define a decor, which could be perceived by the user as a three-dimensional decor.

According to a first particularly advantageous embodiment of the present invention, the vitreous coating according to the invention may be single-layered: in this case, it consists only of the finish layer.

In the context of the present invention, a finish layer is a layer which is intended to be in contact with the environment.

According to a second particularly advantageous embodiment of the present invention, the vitreous coating according to the invention may be multilayered: in this case, it may advantageously comprise:
  a base layer intended to be arranged on a support, and
  at least one finish layer covering the base layer and intended to be in contact with the outside environment, the finish layer being in the form of a continuous film of a sol-gel material comprising a matrix formed from at least one metallic polyalkoxylate in which said anisotropic particles are dispersed.

The base layer can be of different natures. For example it may be in the form of a continuous film of a sol-gel material, the sol-gel material preferably comprising a matrix formed from at least one metallic polyalkoxylate.

The base layer may also be a continuous or discontinuous hard base, this hard base being made of enamel, of ceramic or of metal.

Examples of metallic polyalkoxylates that could be used in the coating, both in the base layer (if any) and in the finish layer, include in particular the polyalkoxysilanes, the aluminates, the titanates, the zirconates, the vanadates, the borates, and mixtures thereof.

Polyalkoxysilanes are the preferred polyalkoxylates in the context of the present invention.

Advantageously, the film of sol-gel material of the finish layer and/or of the base layer (if any) may further comprise at least 5% by weight with respect to the total weight of the coating of at least one colloidal metallic oxide dispersed in said matrix.

Advantageously, the colloidal metallic oxide is selected from the group comprising silica, alumina, cerium oxide, zinc oxide, vanadium oxide and zirconium oxide.

Advantageously, the sol-gel material forming the vitreous coating according to the invention may further comprise at least one silicone oil.

Examples of silicone oils that could be used in the context of the present invention include in particular the methylphenyl silicone oils, the methyl silicone oils and the hydroxylated silicone oils.

Advantageously, the vitreous coating according to the invention may further comprise at least one pigment selected from the thermostable pigments, the metallic salts, the semiconductor thermochromic pigments, and mixtures thereof.

The present invention also relates to an article characterised in that it comprises a support having two opposite sides, at least one of which is covered with a coating according to the invention.

Concerning the nature of the support of the article, it may be made of a material selected from metals, wood, glass, ceramics and plastic materials. Preferably, the support of the article will be a metallic support of made of anodised or non-anodised aluminium, or of polished, brushed or micro-shotpeened aluminium, or of polished, brushed or micro-shotpeened stainless steel, or of cast iron, or of hammered or polished copper.

Examples of articles according to the invention include in particular the culinary articles, the sole plates of electric irons, the plates of hair straighteners, or even the hoods of household appliances.

The present invention also relates to the use of a vitreous coating according to the invention as defined above to manufacture a culinary article.

Finally, the present invention also relates to a method for manufacturing a vitreous coating on a support in which anisotropic particles are dispersed, characterised in that it comprises a step of orienting said anisotropic particles by physical means (for example by applying an electrical or magnetic field) or mechanical means (for example when applying the coating using a unidirectional applicator such as a micro-nozzle) in at least one area (311) of said vitreous coating.

According to a particularly advantageous embodiment of the invention, the method may comprise the following steps:
  a) providing the support;
  b) a step of preparing a hybrid composition comprising at least one metallic alkoxide type sol-gel precursor and anisotropic shaped particles;
  c) hydrolysing said sol-gel precursor by introduction of water and of an acid or basic catalyst, followed by a condensation reaction to obtain a sol-gel composition SG;
  d) maintaining the support at a temperature lower than or equal to 100° C. and then applying, directly or indirectly on all or part of the support, at least one layer (31) of sol-gel composition SG;
  e) orienting said anisotropic particles by physical or mechanical means in at least one area of the SG composition layer; then
  f) firing, preferably at a temperature comprised between 200° C. and 350° C.

In the case where magnetisable anisotropic shaped particles are used, step e) of orientation of the magnetisable particles is a magnetisation step by application of a magnetic field, which is carried out either during the application d) of the sol-gel composition SG on the support, or after said application step d) and before the firing step f).

According to a particularly advantageous embodiment of the present invention, the sol-gel composition SG is substantially free of opaque pigments, so that the SG composition layer is transparent, and the magnetisation e) comprises the application of a magnetic field in at least one specific area of the SG composition layer, the area(s) immediately adjacent to said specific area not being subjected to the effect of the magnetic field or being subjected to the effect of the substantially horizontal field lines, so as to form a three-dimensional pattern.

The method according to the invention can also further comprise, prior to applying d) the SG composition layer, forming at least one base layer (30) arranged between the support and the finish layer. Preferably the base layer is a pigmented base layer obtained by
  preparing a coloured composition comprising at least one metallic alkoxide type sol-gel precursor and at least one pigment selected from the thermostable pigments, the metallic salts, the thermochromic semiconductor pigments and mixtures thereof; then hydrolysing said sol-gel precursor by introduction of water and of an acid or basic catalyst, and condensing to obtain a coloured sol-gel composition SG0; and applying, directly on all or part of the support having a temperature lower than 100° C., the coloured sol-gel composition to form the pigmented base layer, this application step preferably being followed by drying at a temperature lower than or equal to 100° C.

Drying the pigmented base layer at a temperature lower than or equal to 100° C. avoids curing the base layer, so that when the finish layer is subsequently applied, this application is done on an "uncured", and therefore substantially non-hydrophobic, base layer: this method not only results in a finish layer in the form of a film, but also creates the possibility for the oriented particles of the finish layer to penetrate in the base layer which is still plastic, and thus to contribute by a better anchorage to improve the strengthening of the mechanical properties.

BRIEF DESCRIPTION OF THE DRAWINGS

Other advantages and features of the present invention will appear from the following description, given by way of non-limitative example and with reference to the accompanying figures.

DETAILED DESCRIPTION OF THE INVENTION

Figure 1:
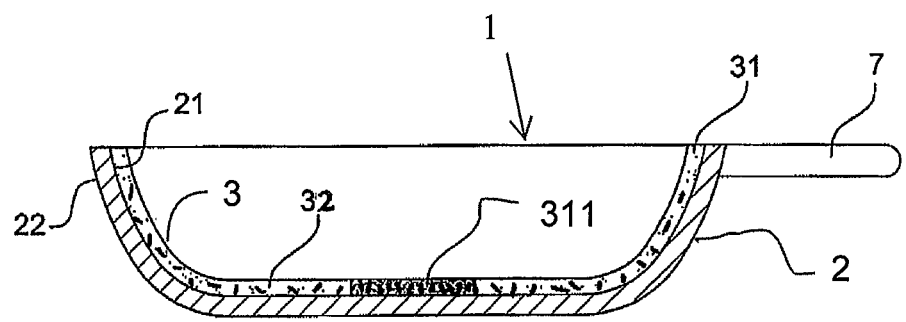
FIG. 1 shows a schematic sectional view of a first embodiment of a frying pan according to the invention provided with a single-layered vitreous coating film (comprising at least one area with anisotropic particles substantially perpendicular to the film)

FIG. 1 shows, as an example of a culinary article according to the invention, a frying pan 1 before the magnetisation step, which comprises a support 2 in the form of a hollow bowl and a gripping handle 7. The support 2 comprises an inner side 21 which is the side oriented towards the food that may be received in the frying pan 1, and an outer side 22 which is intended to be arranged towards an external heat source.

The support 2 comprises, on its inner side 21, a single layer of vitreous coating 3, which consists only of a finish layer 31 in the form of a continuous film. It is a continuous film 31 of a sol-gel material comprising a matrix formed from at least one metallic polyalkoxylate and in which anisotropic shaped particles 32 (for example flakes or microfibres, as shown in the illustrative examples of the present invention described below) are dispersed.

FIG. 1 shows that the finish layer comprises at least one area 311 in which the particles are substantially perpendicular to the finish layer.

This specific orientation of the anisotropic particles 32 in the first area 311 can be obtained for example by magnetisation if the anisotropic particles comprise magnetisable particles. This magnetisation of the specific first area 311 can be achieved for example by arranging underneath the support a permanent magnet, in particular of elastomeric type (which limits the magnetisation conditions to a temperature lower than 80° C.) or an electromagnet.

It is also possible to use a ferrite or neodymium type permanent magnet. In this case, the maximum temperature value of the conditions under which magnetisation is carried out can then be greater than 80° C., but should remain below the Curie temperature of the magnets used.

Preferably, a magnet is used that emits a magnetic field of intensity comprised between 40 and 100 mT, preferably around 70 mT.

FIG. 1 clearly shows that the magnetisable particles of the finish layer 31 are oriented perpendicularly to this layer in this specific first area 311, according to the field lines generated by the permanent magnet located just underneath this area 311.

Figure 2:
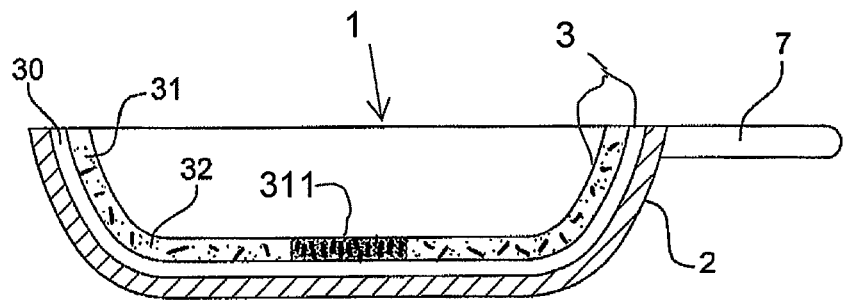
FIG. 2 shows a schematic sectional view of a second embodiment of a frying pan according to the invention provided with a double-layered vitreous coating comprising at least one area with anisotropic particles substantially perpendicular to the film.

FIG. 2 shows a schematic sectional view of a second embodiment of a frying pan according to the invention, which differs from that illustrated in FIG. 1 in that the vitreous coating 3 is double-layered. The double-layered coating 3 comprises a base layer 30 arranged on the inner side 21 of the support 2 and a finish layer 31 in the form of a continuous film of a sol-gel material covering the base layer 30, the anisotropic particles 32 being included in the finish layer. The sol-gel material of the finish layer may comprise in particular a matrix formed from at least one metallic polyalkoxylate in which the particles 32 are dispersed.

Figure 3:
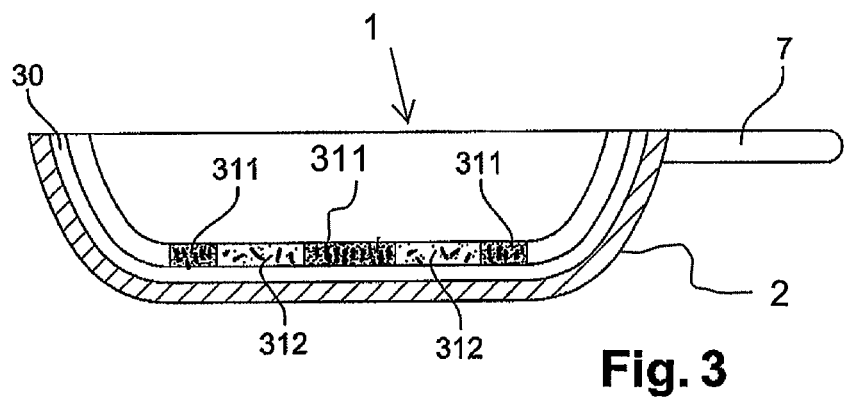
FIG. 3 shows a schematic sectional view of a third embodiment of a frying pan according to the invention provided with a double-layered vitreous coating comprising a three-dimensional pattern.

FIG. 3 shows a schematic sectional view of a third embodiment of a frying pan 1 according to the invention provided with a vitreous double-layered coating comprising a three-dimensional pattern formed by the alternation of second areas 312 with anisotropic particles substantially parallel to the film and of first areas 311 with particles substantially perpendicular to the film.

The specific orientation of the anisotropic particles 32 in the first areas 311 can be obtained for example by magnetisation if the anisotropic particles comprise magnetisable particles.

This magnetisation can therefore be achieved for example by arranging underneath the support a plurality of concentric permanent magnets made of elastomer, which emit a magnetic field of the same intensity or of different intensities, for example of about 80 mT when measured independently. These concentric magnets may advantageously be in the form of a central disc of small diameter (for example lower than or equal to 15 mm) and of a plurality of concentric rings having a width of about 10 to 15 mm arranged around this central disc. These magnets may advantageously be arranged on a substrate (for example a stainless steel plate) which can move perpendicularly to the support of the article. This movement can be done by means of an actuator that brings the substrate (or plate) near the article to be magnetised, so as to define an air gap.

The magnetisable anisotropic particles will then oriente themselves according to the field lines, in other words perpendicularly to the support 2 (or to the film 3) at the areas 311 underneath which a magnet was arranged (the field lines being perpendicular to the coating in the form of a film), and parallelly to the support 2 (and thus to the film 3) in the second areas 312 where the field lines are parallel to the support 2, with a progressive orientation continuum of the magnetisable anisotropic particles between these two areas.

Figure 4:
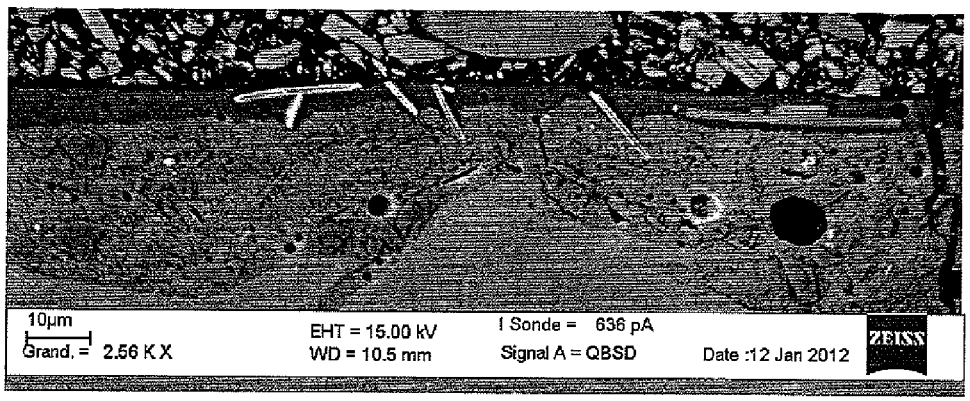
FIG. 4 shows a series of five scanning electron microscope (SEM) images 4A to 4E of a cross section of the frying pan shown in FIG. 3 taken at the area with anisotropic particles substantially perpendicular to the film.
Figure 4:
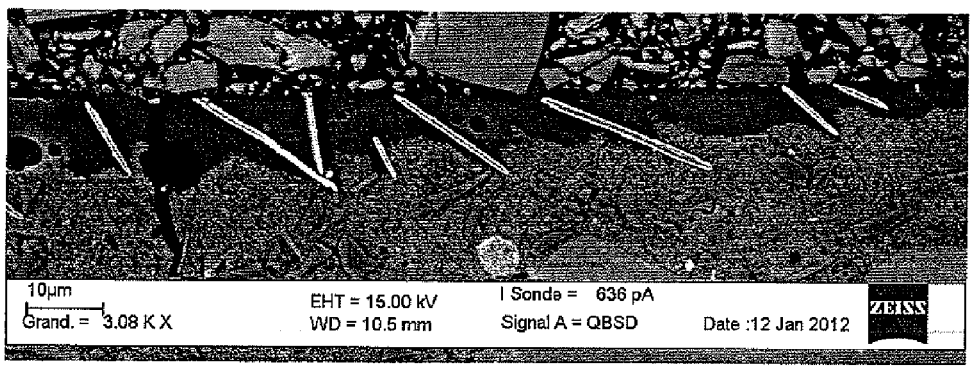
Figure 4:
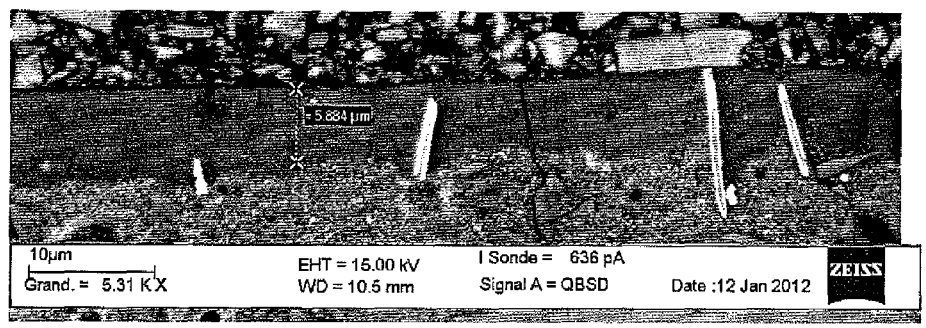
Figure 4:
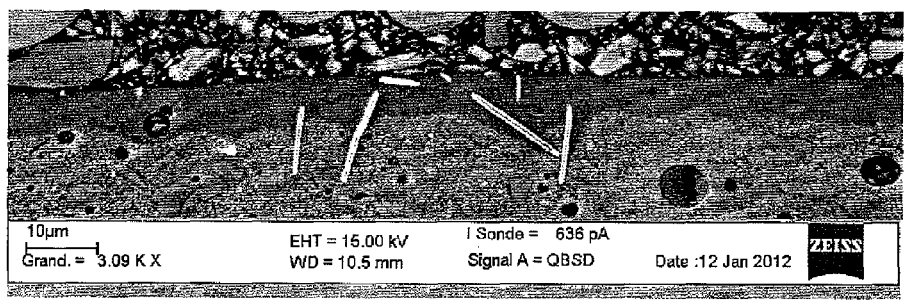
Figure 4:
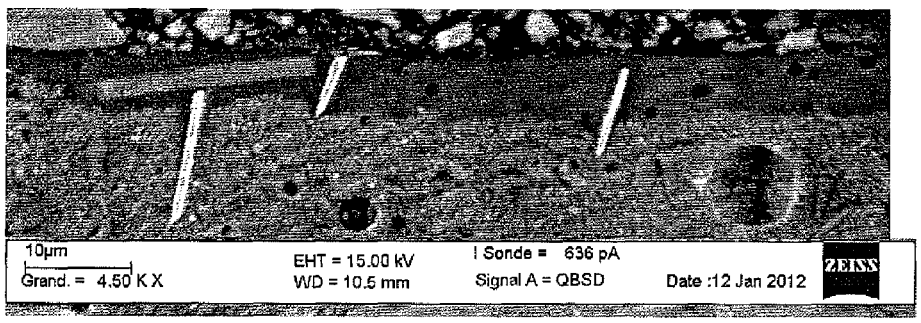

FIG. 4 shows a series of five scanning electron microscope (SEM) images 4A to 4E of a cross section of the frying pan 1 shown in FIG. 3 taken at the area 311 with anisotropic particles substantially perpendicular to the coating in the form of a film.

Figure 5:
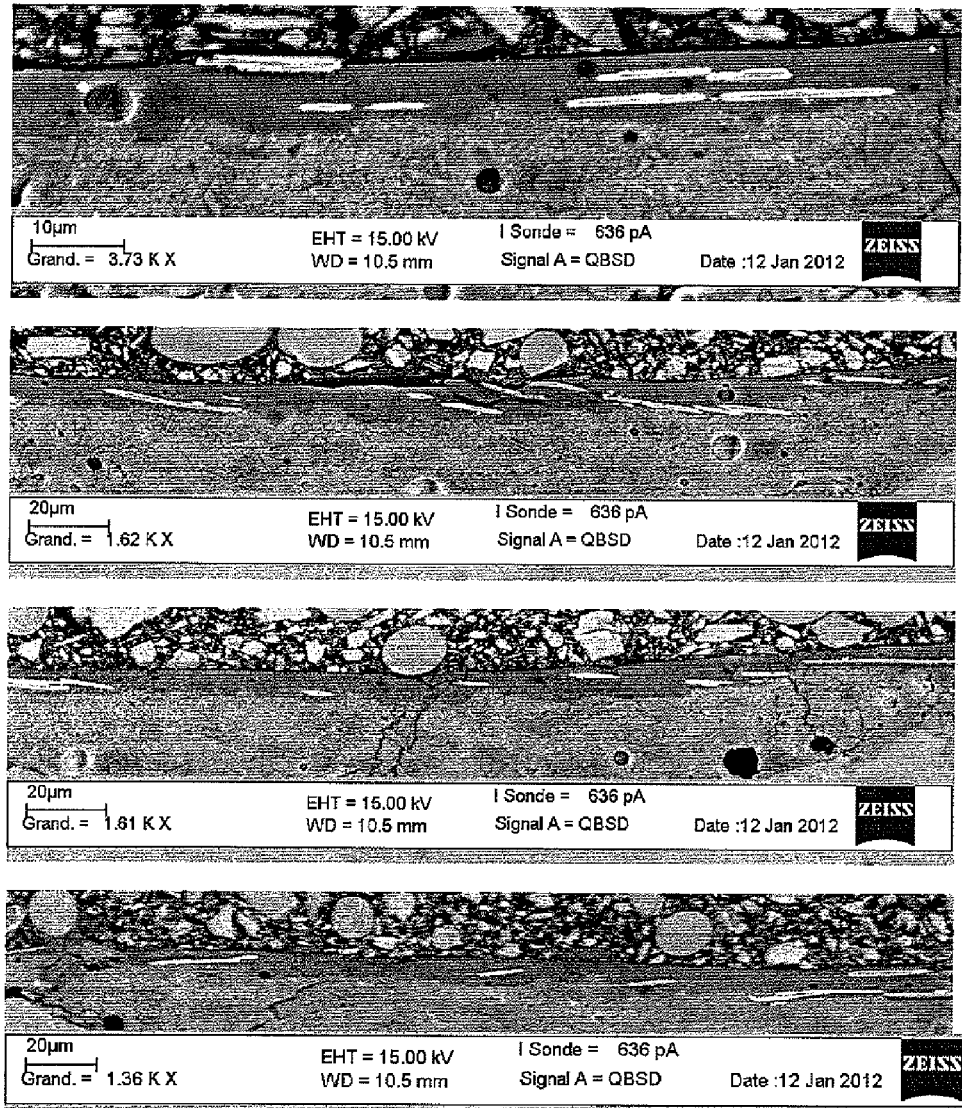
FIG. 5 shows a series of four scanning electron microscope (SEM) images 5A to 5D of a cross section of the frying pan shown in FIG. 3 taken at the area with anisotropic particles substantially parallel to the film.

FIG. 5 shows a series of four scanning electron microscope (SEM) images 5A to 5D of a cross section of the frying pan 1 shown in FIG. 3 taken at the area 312 with anisotropic particles substantially parallel to the coating.

In the case of magnetisable anisotropic particles, first area 311 corresponds to an area underneath which a permanent magnet was arranged and at the perpendicular of which the field lines are perpendicular to the support. In second area 312 the field lines are oriented parallel to the support and movement from one to the next is via a progressive orientation continuum of the magnetisable particles.

EXAMPLES

Products
In the Pigmented Sol-Gel Base Layer
Colloidal Metallic Oxide
  colloidal silica in the form of a 30% silica aqueous solution, sold by the Clariant company under the trade name Klebosol,
  colloidal silica in the form of a 40% silica aqueous solution, sold by the Grace Davison company under the trade name Ludox,
  colloidal alumina in the form of a 5% aqueous solution sold by the DGTec company.
Solvents
  isopropyl alcohol,
  2-(2-Butoxyethoxy)-ethanol (trade name: Butyl CARBITOL™),
  demineralised water.
Silicone Oil
  methyl silicone oil sold by the DOW CORNING company under the trade name "DOW CORNING 200 Fluid", and having a viscosity of 300 cSt,
  methyl silicone oil sold by the Bluestar company under the trade name "Rhodorsil 47V50",
  hydroxylated methyl silicone oil sold by the Wacker company under the trade name "OEL CT101M".
Pigments
  mineral black pigment sold by the Ferro company under the trade name "FA 1220",
  ultramarine blue pigment sold by the Holliday pigments company, under the trade name "CM13",
  perylene red pigment sold by BASF,
  titanium dioxide white pigment sold by the Kronos company,
  orange pigment "259150" sold by the BASF company.
Fillers
  alumina powder sold by the Alcan company under the trade name "CAHPF 1000",
  alumina nanometric flakes dispersed in a 40% aqueous phase sold by the Baikowski company.
Sol-Gel Precursors
  methyltriethoxysilane (MTES) of formula $Si(OC_2H_5)_3CH_3$,
  methyltrimethoxysilane (MTMS) of formula $Si(OCH_3)_3CH_3$,
  tetraethyl orthosilicate (TEOS) of formula $Si(OC_2H_5)_4$.
Acids
  formic acid,
  acetic acid.
In the Sol-Gel Finish Layer:
Colloidal Metallic Oxide
  colloidal silica in the form of a 30% silica aqueous solution, sold by the Clariant company under the trade name Klebosol,
  colloidal silica in the form of a 40% silica aqueous solution, sold by the Grace Davison company under the trade name Ludox,
  colloidal alumina in the form of a 5% aqueous solution sold by the DGTec company.
Solvents
  isopropyl alcohol,
  butyl glycol,
  demineralised water.
Silicone Oil
  methyl silicone oil sold by the Dow Corning company under the trade name "DOW CORNING 200 Fluid", and having a viscosity of 300 cSt,
  methyl silicone oil sold by the BLUESTAR company under the trade name "Rhodorsil 47V50",
  hydroxylated methyl silicone oil sold by the Wacker company under the trade name "OEL CT101M".
Anisotropic Particles
  mica flakes encapsulated with iron oxide sold by the ECKART company under the name STAPA TA Ferricon 200 (magnetisable flakes),
  mica flakes encapsulated with iron oxide sold by the MERCK company under the name Colorona Blackstar blue or green (magnetisable flakes),
  unencapsulated mica flakes sold by the MERCK company under the name Iriodin 119 (non-magnetisable flakes),
  stainless steel microfibres.
Sol-Gel Precursors
  methyltriethoxysilane (MTES) of formula $Si(OC_2H_5)_3CH_3$,
  methyltrimethoxysilane (MTMS) of formula $Si(OCH_3)_3CH_3$,
  tetraethyl orthosilicate (TEOS) of formula $Si(OC_2H_5)_4$.
Acids
  formic acid,
  acetic acid.
Tests
Chipping Resistance Test The ability of different vitreous coatings, of the same thickness and applied to the same metallic substrates, to withstand chipping is evaluated as follows.

These coatings are given a 10 mm long scratch, made using a calibrated diamond stylus of 50 microns in diameter, which is applied with a force gradually increasing from 0 to 5 Newtons. To do that, a device sold under the name "Microscratch tester" of the CSM Instruments company is used.

After forming the scratch, a microscope is used to determine the force from which chipping of the coating down to the metal is visible (see table 3 for results).

Comparative Example 1

Formation of a Double-Layered Vitreous Coating According to the Method of International Application WO2010/123294, which is Incorporated by Reference its Entirety Herein.

A first coloured sol-gel composition is prepared in the form of a bi-component comprising a part A and a part B:
- part A comprises a colloidal silica dispersion, demineralised water, the isopropyl alcohol, the butyl glycol, the silicone oil, the fillers and the pigments,
- part B comprises the sol-gel precursor (silane) as well as the organic acid.

These two parts A and B can be stored for more than 6 months separately.

Parts A and B are then combined in a mixer at room temperature (for example a reactor provided with a blade for stirring, or a container that will be rotated at 80 rpm. on a jar mill) in order to initiate the silane hydrolysis reaction. The mixture must then be allowed to mature for at least 24 hours before application of the mixture A+B on a support, so as to allow the hydrolysis/condensation reactions to progress sufficiently. Under the effect of these reactions an increase in temperature up to 55° C. is observed. This maturation time may however be reduced or increased depending on the stirring speed of the products and on the temperature reached or maintained during the stirring. The pot life of the mixture is at least 48 hours.

The coloured sol-gel composition is shown in table 1:

TABLE 1

| Components | Amounts in weight percent (variation ranges) | Amounts in weight percent (preferred example) |
| --- | --- | --- |
| Klebosol 30% colloidal silica | 25-35% | 29% |
| Demineralised water | 10-15% | 10% |
| Isopropyl alcohol | 1-5% | 4.5% |
| 47V50 silicone oil | 0.1-1% | 1% |
| FA1220 black pigment | 20-25% | 20% |
| MTES | 30-35% | 35% |
| Formic acid | 0.5-1% | 0.5% |

The A+B mixture is then filtered on a stainless steel mesh having apertures of 40 microns in size, before being applied with a pneumatic spray gun in at least one layer of 35 microns in thickness to form a coloured base layer, on the inner surface of an aluminium support which has been sandblasted, degreased, and heated to a temperature of 55° C.

The base layer thus formed is then dried at 100° C. for 30 minutes, as taught by WO 2010/123294.

A colourless sol-gel composition is then prepared in the same way as for the pigmented base layer described above, but replacing the pigments with flakes encapsulated with iron oxide. This colourless sol-gel composition is filtered on a stainless steel mesh having apertures of 80 μm in size and applied using a pneumatic spray gun on the base layer, which is heated to a temperature of 55° C.

The colourless sol-gel composition is shown in table 2:

TABLE 2

| Components | Amounts in weight percent (variation ranges) | Amounts in weight percent (preferred example) |
| --- | --- | --- |
| Ludox 40% colloidal silica | 25-30% | 30% |
| Demineralised water | 10-15% | 10% |
| Isopropyl alcohol | 1-5% | 5% |
| Butyl glycol | 5-15% | 10% |
| 47V50 silicone oil | 0.1-1% | 1% |
| Colorona Blackstar flakes OR stainless steel microfibres | 0.1-15% | 2% |
| MTES | 35-45% | 40% |
| Acetic acid | 1-2% | 2% |

It proves impossible to form a continuous film with the colourless sol-gel composition layer. Indeed, the method as taught by WO 2010/123294 with a drying step at at least 100° C. leads to an excessive densification of the coloured base layer, which thus develops a hydrophobic nature such that a continuous layer can no longer be formed with the flaked colourless sol-gel composition: the latter retracts, when applied on the base layer, in the form of isolated droplets.

Consequently, if the conditions of the method for manufacturing a sol-gel coating as taught by WO 2010/123294 are applied, it is not possible to form a homogeneous vitreous double-layered coating.

Comparative Example 2

Formation of a Single-Layered Vitreous Coating Film Comprising Flakes Substantially Parallel to the Film.

A colourless sol-gel composition is prepared in the form of a bi-component comprising a part A and a part B:
- part A comprises a colloidal silica dispersion, the demineralised water, the isopropyl alcohol, the butyl glycol, the silicone oil as well as mica flakes encapsulated with iron oxide,
- part B comprises a sol-gel type precursor (silane) as well as an organic acid.

These two parts A and B can be stored for more than 6 months separately.

Parts A and B are then combined in a mixer at room temperature (for example a reactor provided with a blade for stirring, or a container that will be rotated at 80 rpm on a jar mill) in order to initiate the silane hydrolysis reaction. The mixture must then be allowed to mature for at least 24 hours before application of the mixture A+B on a support, so as to allow the hydrolysis/condensation reactions to progress sufficiently. Under the effect of these reactions an increase in temperature up to 55° C. is observed. This maturation time may however be reduced or increased depending on the stirring speed of the products and on the temperature reached or maintained during the stirring. The pot life of the mixture is at least 48 hours.

The colourless sol-gel composition is the same as that shown in table 2.

The mixture is then filtered on a stainless steel mesh having apertures of 80 microns in size before being applied with a pneumatic spray gun in at least one continuous film of 20 microns in thickness, on an aluminium support which has been sandblasted, degreased, and heated to a temperature of about 60° C. to facilitate the application.

During spraying the particles arrive randomly and, under the effect of gravity, they oriente themselves substantially parallelly to the support as long as they have sufficient mobility to do so.

The coating thus formed is then fired, at a temperature comprised of 250° C. for at least 15 minutes.

The final dry thickness of the coating thus obtained is 12 μm.

The observations of this coating through scanning electron microscope (SEM) correspond to the SEM images shown in FIG. 5, which show that the flakes contained in the coating film are for the most part substantially parallel to the film, in other words at an angle lower than 20° with respect to the substrate.

Comparative Example 3

Formation of a Double-Layered Vitreous Coating Film Comprising Flakes Substantially Parallel to the Film.

A coloured sol-gel composition is prepared in the form of a bi-component comprising a part A and a part B:
  part A comprises a colloidal silica dispersion, demineralised water, the isopropyl alcohol, the butyl glycol, the silicone oil, the fillers and the pigments,
  part B comprises a sol-gel precursor (silane), as well as the organic acid.

These two parts A and B can be stored for more than 6 months separately.

Parts A and B are then combined in a mixer at room temperature (for example a reactor provided with a blade for stirring, or a container that will be rotated at 80 rpm on a jar mill) in order to initiate the silane hydrolysis reaction. The mixture must then be allowed to mature for at least 24 hours before application of the mixture A+B on a support, so as to allow the hydrolysis/condensation reactions to progress sufficiently. Under the effect of these reactions an increase in temperature up to 55° C. is observed. This maturation time may however be reduced or increased depending on the stirring speed of the products and on the temperature reached or maintained during the stirring. The pot life of the mixture is at least 48 hours.

The coloured sol-gel composition is the same as that shown in table 1.

The mixture is then filtered on a stainless steel mesh having apertures of 40 microns in size before being applied with a pneumatic spray gun in at least one layer of 55 microns in thickness, on the inner surface of an aluminium support which has been sandblasted, degreased, and heated to a temperature of 55° C. to facilitate application of the mixture on the substrate.

A colourless sol-gel composition containing encapsulated mica flakes is then prepared in the same way as in comparative example 2, and then applied by spraying with a spray gun on the pigmented base layer to form a finish layer in the form of a film.

This is followed by firing of the whole at a temperature of 250° C. for at least 15 minutes minimum.

The colourless sol-gel composition is the same as that shown in table 2.

The final dry thickness of the coating thus formed is 45 microns.

The observations of this coating through scanning electron microscope (SEM) correspond to the SEM images shown in FIG. 5, which show that the flakes contained in the coating film are for the most part substantially parallel to the film, in other words at an angle lower than 20° with respect to the substrate.

Comparative Example 4

Formation of a Double-Layered Vitreous Coating Film Comprising Microfibres Substantially Parallel to the Film.

This example only differs from comparative example 3 by the particles in the finish layer: the encapsulated flakes are replaced by stainless steel microfibres.

The final dry thickness of the coating thus formed is also 45 microns.

Example 1

Formation of a Single-Layered Coating Film According to the Present Invention Comprising Flakes Substantially Perpendicular to the Film.

A sol-gel composition in the form of a bi-component A+B is prepared in the same way as in comparative example 2. This composition is also applied, in the same way as in comparative example 2, on an aluminium support which has been sandblasted, degreased, and heated to a temperature of 60° C.

However, immediately after the application by spraying of the sol-gel composition (but prior to firing), a magnetic field of 70 mT is applied using a permanent magnet arranged underneath the substrate. Under the action of the magnetic field, the mica flakes, due to their encapsulation with magnetic iron oxide, oriente themselves according to the field lines, in other words perpendicularly to the magnet. It is observed that the encapsulated mica flakes are mainly inclined at an angle $\alpha$ comprised between 20° and 90° with respect to the average plane of the film.

The coating is then fired at 250° C. for at least 15 minutes minimum.

The final dry thickness of the coating thus formed is 12 microns.

Example 2

Formation of a Double-Layered Coating Film According to the Present Invention Comprising Flakes Substantially Perpendicular to the Film A coloured sol-gel composition and a colourless sol-gel composition containing encapsulated mica flakes are prepared in the same way as in comparative example 3. These compositions are applied in succession on an aluminium support which has been sandblasted, degreased and heated to a temperature of 55° C., also in the same way as in comparative example 3.

However, immediately after the application by spraying of the colourless sol-gel composition (but prior to firing), a magnetic field of 70 mT is applied using a permanent magnet arranged underneath the substrate. Under the action of the magnetic field, the mica flakes, due to their encapsulation with magnetic iron oxide, oriente themselves according to the field lines, in other words perpendicularly to the magnet substantially vertically.

The coating is then fired at 280° C. for at least 15 minutes.

The observations of this coating through scanning electron microscope (SEM) correspond to the SEM images shown in FIG. 4, which show that the majority of the flakes tend to oriente themselves perpendicularly to the formed coating film, in other words most of them are at an angle of inclination comprised between 20° and 90° with respect to the substrate.

Example 3

Formation of a Double-Layered Coating Film According to the Present Invention Comprising Microfibres Substantially Perpendicular to the Film This example only differs from example 2 by the shape of the particles in the finish layer: the encapsulated flakes are replaced by stainless steel microfibres.

Example 4

Formation of a Double-Layered Coating Film According to the Present Invention Comprising Flakes Substantially Perpendicular to the Film This example only differs from example 2 in the nature of the silicone oil. The 47V50 silicone oil is replaced by the CT101M OEL hydroxylated silicone oil, in the same weight proportions (shown in table 2).

Example 5

Evaluation of the Resistance to Chipping

The ability to resist to chipping of the vitreous coatings formed in examples 1 to 4 and comparative examples 1 to 4 is evaluated according to the test described above. The results obtained are shown in table 3 below:

TABLE 3

| | Coating thickness (in μm) | Delamination to the metal (in N) |
|---|---|---|
| Comparative example 1 (method according to WO2010-123294) | NA | Not measurable given the discontinuity of the film |
| Comparative example 2 (single-layered and non-oriented flakes) | 12 | 1.31 +/- 0.09 |
| Example 1 (single-layered and oriented flakes) | 12 | 1.57 +/- 0.10 |
| Comparative example 3 (double-layered and non-oriented flakes) | 45 | 3.91 +/- 0.17 |
| Example 2 (double-layered and oriented flakes) | 45 | 4.56 +/- 0.19 |
| Comparative example 4 (double-layered and non-oriented microfibres) | 45 | 3.98 +/- 0.16 |
| Example 3 (double-layered and oriented microfibres) | 45 | 4.49 +/- 0.14 |
| Example 4 (double-layered with hydroxylated oil, oriented flakes) | 45 | 4.52 +/- 0.13 |

The comparison of example 1 with comparative example 2 (single-layered coating) clearly shows that the force to be applied during the test to achieve a delamination to the metal is greater when the particles are, in the context of the invention, oriented substantially perpendicularly to the coating (in other words, that they are mainly inclined at an angle α comprised between 20° and 90° with respect to the average plane of the film), than when not (in other words, the particles are randomly oriented, or are mainly inclined at an angle α lower than 20° with respect to the average plane of the film). This means that the resistance to chipping is improved when the coating comprises oriented particles.

The comparison of example 2 and comparative example 3 leads to the same conclusions for a double-layered coating.

The comparison of example 3 and comparative example 4 shows that similar conclusions also apply when anisotropic particles of different shape (microfibres instead of flakes) are used.

Finally, the comparison of example 4 and example 2 shows that when a hydroxylated silicone oil is used, the same results are achieved as with a non-hydroxylated silicone oil.

The invention claimed is:

1. Vitreous coating comprising at least one layer in the form of a continuous film of a sol-gel material comprising a matrix formed from at least one metallic polyalkoxylate and in which anisotropic shaped particles are dispersed, said layer comprising at least one first area in which said particles are particles which are inclined at an angle α between 20° and 90° with respect to the average plane of the film,
   wherein more than 66% of said anisotropic shaped particles are inclined at an angle α between 20° and 90° with respect to the average plane of the film, and
   wherein said coating further comprises, adjacent to the first area, at least one second area in which more than 66% of the particles are particles which are inclined at an angle β that is greater than 0° and less than 20° with respect to the average plane of the film.

2. Coating according to claim 1, wherein more than 80% of said anisotropic shaped particles are inclined at an angle α between 20° and 90° with respect to the average plane of the film.

3. Coating according to claim 1, wherein said particles comprise particles capable of being oriented by mechanical or physical means.

4. Coating according to claim 3, wherein said particles capable of being oriented are magnetisable particles.

5. Coating according to claim 4, wherein said magnetisable particles comprise at least one ferromagnetic metal.

6. Coating according to claim 5, wherein the magnetisable particles have a core-shell structure, in which the ferromagnetic metal is in the core and/or in the shell of said particles.

7. Coating according to claim 6, wherein the magnetisable particles are mica flakes encapsulated with iron oxide $Fe_2O_3$.

8. Coating according to claim 6, wherein the magnetisable particles are flakes whose core is made of a plastic material and the shell is made of iron oxide $Fe_2O_3$, or flakes or fibres whose core is made of ferromagnetic metal and the shell is made of a plastic material or of a sol-gel material.

9. Coating according to claim 4, wherein said vitreous coating layer further comprises non-magnetisable particles.

10. Coating according to claim 9, wherein the magnetisable particles, and the non-magnetisable particles, have a core-shell structure.

11. Coating according to claim 9, wherein the non-magnetisable particles are selected from the group comprising mica flakes, and titanium dioxide encapsulated mica or silica flakes.

12. Coating according to claim 4, wherein the magnetisable particles are ferritic stainless steel fibres.

13. Coating according to claim 1, wherein more than 80% of said particles are, in the second area, inclined at an angle β lower than 20° with respect to the average plane of the film.

14. Coating according to claim 1, said coating being non-opaque and further comprising, adjacent to the first area, at least one second area in which the particles are randomly arranged in the layer in the form of a film.

15. Coating according to claim 1, wherein the alternation of the first and second areas defines a decor.

16. Coating according to claim 1, said coating being a finish layer.

17. Coating according to claim 1, comprising:
   a base layer intended to be arranged on a support, and
   at least one finish layer covering said base layer and intended to be in contact with the outside environment, said finish layer being in the form of a continuous film of a sol-gel material comprising a matrix formed from at least one metallic polyalkoxylate in which said anisotropic particles are dispersed.

18. Coating according to claim 17, wherein said base layer is also in the form of a continuous film of a sol-gel material, the sol-gel material preferably comprising a matrix formed from at least one metallic polyalkoxylate.

19. Coating according to claim 17, wherein said base layer is a continuous or discontinuous hard base, said hard base being made of one of enamel, of ceramic, or of metal.

20. Coating according to claim 17, wherein the metallic polyalkoxylate of the finish layer, and of the base layer, is a polyalkoxysilane.

21. Coating according to claim 20, wherein the film of sol-gel material of the finish layer, and of the base layer, further comprises at least 5% by weight with respect to the total coating weight of at least one colloidal metallic oxide dispersed in said matrix, said oxide being selected from the group comprising silica, alumina, cerium oxide, zinc oxide, vanadium oxide and zirconium oxide.

22. Coating according to claim 1, wherein the sol-gel material forming said vitreous coating further comprises at least one silicone oil.

23. Coating according to claim 22, wherein the silicone oil is selected from methyl-phenyl silicone oils, methyl silicone oils and hydroxylated silicone oils.

24. Coating according to claim 1, wherein said vitreous coating comprises at least one pigment selected from the thermostable pigments, the metallic salts, the thermochromic semiconductor pigments, and mixtures thereof.

25. Article comprising a support having two opposite sides, at least one of which is covered with a coating as defined in claim 1.

26. Article according to claim 25, wherein the support is made of a material selected from metals, wood, glass, ceramics and plastic materials.

27. Article according to claim 26, wherein the support is a metallic support made of one of anodised or non-anodised aluminium, or of polished, brushed, or micro-shotpeened aluminium, or of polished, brushed or micro-shotpeened stainless steel, or of cast iron, or of hammered or polished copper.

28. Article according to claim 25, which is a culinary article, or a sole plate of an electric iron, or plates of hair straighteners, or a hood of a household appliance.

29. Method for manufacturing a vitreous coating according to claim 1 on a support in which anisotropic particles are dispersed, comprising a step of orienting said anisotropic particles by physical or mechanical means in at least one area of said vitreous coating according to claim 1.

30. Method according to claim 29, comprising the following steps:
a) providing the support;
b) preparing a hybrid composition comprising at least one metallic alkoxide type sol-gel precursor and anisotropic shaped particles;
c) hydrolysing said sol-gel precursor by introduction of water and of an acid or basic catalyst, followed by a condensation reaction to obtain a sol-gel composition SG;
(d) maintaining the support at a temperature lower than or equal to 100° C. followed by applying, directly or indirectly on all or part of the support, at least one layer of sol-gel composition SG;
e) orienting said anisotropic particles by physical or mechanical means in at least one area of said SG composition layer; then
f) firing.

31. Method according to claim 30, wherein said anisotropic shaped particles are magnetisable particles, and
in step e) of orienting said magnetisable particles is a step of magnetisation by applying a magnetic field, said magnetisation e) being carried out either during the application d) of the sol-gel composition SG on the support, or after said application step d) and prior to the firing step f).

32. Method according to claim 31, wherein a sol-gel composition SG essentially free of opaque pigments is prepared, so that the SG composition layer (31) is essentially transparent, and
wherein the magnetisation step e) comprises the application of a magnetic field in at least one specific first area of the SG composition layer, second area(s) immediately adjacent to said specific first area not being subjected to the effect of the magnetic field or being subjected to the effect of field lines substantially parallel to the layer being in the form of a film, so as to form a three-dimensional pattern.

33. Method according to claim 27, further comprises, prior to the application step d) of the SG composition layer, forming at least one base layer arranged between the support and said SG composition layer.

34. Method according to claim 33, wherein the base layer is a pigmented base layer obtained by
preparing a colored composition comprising at least one metallic alkoxide type sol-gel precursor and at least one pigment selected from thermostable pigments, metallic salts, thermochromic semiconductor pigments and mixtures thereof; then
hydrolysing said sol-gel precursor by introduction of water and of an acid or basic catalyst, and condensing to obtain a colored sol-gel composition SG0; and
applying, directly on all or part of the support having a temperature lower than 100° C., the colored sol-gel composition to form the pigmented base layer.

35. Method according to claim 34, further comprising, after applying the colored sol-gel composition, drying at a temperature lower than or equal to 100° C.

36. Method according to claim 30, wherein the firing step f) is carried out at a temperature of 200° C. to 350° C.

* * * * *